United States Patent
Cohen et al.

(10) Patent No.: US 8,763,149 B1
(45) Date of Patent: Jun. 24, 2014

(54) SITE DEPENDENT EMBEDDED MEDIA PLAYBACK MANIPULATION

(75) Inventors: Gabriel Cohen, San Mateo, CA (US); Nick Dower, San Francisco, CA (US)

(73) Assignee: Google Inc., Mountain View, CA (US)

( * ) Notice: Subject to any disclaimer, the term of this patent is extended or adjusted under 35 U.S.C. 154(b) by 962 days.

(21) Appl. No.: 12/113,034

(22) Filed: Apr. 30, 2008

(51) Int. Cl.
*H04L 29/06* (2006.01)
*G06F 21/10* (2013.01)
*G06F 21/12* (2013.01)
*G06F 21/62* (2013.01)
*G06F 21/60* (2013.01)
*G06Q 20/12* (2012.01)

(52) U.S. Cl.
CPC .............. *H04L 63/10* (2013.01); *H04L 63/101* (2013.01); *H04L 63/107* (2013.01); *H04L 29/06823* (2013.01); *H04L 29/06829* (2013.01); *H04L 2209/603* (2013.01); *H04L 2209/605* (2013.01); *H04L 2463/101* (2013.01); *H04L 2463/103* (2013.01); *G06F 21/10* (2013.01); *G06F 21/121* (2013.01); *G06F 21/60* (2013.01); *G06F 21/62* (2013.01); *G06Q 20/1235* (2013.01); *G06Q 2220/10* (2013.01)
USPC .......... 726/27; 726/1; 726/2; 726/26; 726/28; 726/29; 726/30; 726/31; 713/165; 713/167; 380/201; 380/203; 380/241; 705/50; 705/51; 705/57; 705/58; 705/59; 709/225; 709/226; 709/229

(58) Field of Classification Search
CPC ......... G06F 9/468; G06F 21/01; G06F 21/06; G06F 2221/2113; G06F 2221/2141; G06F 2221/2415; H04L 29/068; H04L 63/10; H04L 2209/60; H04L 2463/101; H04L 2463/103; G06Q 20/123
USPC ...................... 726/26–33, 1, 2; 709/217–229; 705/50–59; 380/200–203, 236–242; 713/164–167
See application file for complete search history.

(56) References Cited

U.S. PATENT DOCUMENTS 6,223,292 B1 * 4/2001 Dean et al. ...................... 726/28
6,460,086 B1 * 10/2002 Swaminathan et al. ...... 709/236

(Continued)

FOREIGN PATENT DOCUMENTS

WO  WO 2006006780 A1 *  1/2006

OTHER PUBLICATIONS

Protecting Digital Content within the Home by Brendan Traw; Publisher: IEEE; Year: 2001.*

(Continued)

*Primary Examiner* — Madhuri Herzog
(74) *Attorney, Agent, or Firm* — Amin, Turocy & Watson, LLP (57) ABSTRACT

Systems and methods for site-dependent embedded media playback manipulation whereby a media owner can enable limited embedding on non-owned or non-monetized websites to direct traffic to a more valuable location. The content owner can specify sets of internet locations with associated sets of rules governing content playback criteria as well as restrictions based upon user categorizations. A playback restriction system consists of a media delivery system and a playback rules system. The media delivery system controls the delivery of the media file with embedded restrictions. The playback rules system controls the nature of the restrictions and the rules of when they are applied. Users will be directed to the location of a more valuable website where the media can be viewed with a less restrictive set of rules.

34 Claims, 4 Drawing Sheets

(56) References Cited

U.S. PATENT DOCUMENTS

| | | | |
|---|---|---|---|
| 7,386,783 B2* | 6/2008 | Lection et al. | 715/203 |
| 2002/0194618 A1* | 12/2002 | Okada et al. | 725/132 |
| 2003/0154217 A1* | 8/2003 | Kinno et al. | 707/104.1 |
| 2004/0196972 A1* | 10/2004 | Zhu et al. | 380/45 |
| 2006/0015944 A1* | 1/2006 | Fields | 726/27 |
| 2007/0038567 A1* | 2/2007 | Allaire et al. | 705/50 |
| 2007/0124251 A1* | 5/2007 | Shimizu et al. | 705/59 |
| 2007/0162979 A1* | 7/2007 | Kamperman et al. | 726/27 |
| 2008/0097786 A1* | 4/2008 | Sachdeva | 705/2 |
| 2008/0189617 A1* | 8/2008 | Covell et al. | 715/738 |
| 2008/0307454 A1* | 12/2008 | Ahanger et al. | 725/36 |
| 2009/0216769 A1* | 8/2009 | Bellwood et al. | 707/9 |

OTHER PUBLICATIONS

Authorization for Digital Rights Management in the Geospatial Domain by Dr. Andreas Matheus; Publisher: ACM; Year: 2005.*

"Sharing YouTube Videos," Published on Dec. 9, 2007, downloaded from http://web.archive.org/web/20071209063849/http://www.youtube.com/sharing on Oct. 1, 2008; 3 pages.

* cited by examiner

SITE DEPENDENT EMBEDDED MEDIA PLAYBACK MANIPULATION

BACKGROUND

1. Field of the Invention

The present invention relates to a media owner's ability to control and modify access rights and restrictions on electronic media files.

2. Related Art

As the popularity of the internet has grown, so too has the trend to freely share information. While sharing of information is not inherently destructive, there is the risk that once content is downloaded to a client system, the file can be misappropriated and freely redistributed without the owner's knowledge or consent. In an effort to control access and distribution of electronic content a number of publishers and copyright holders have attempted to limit the usage of digital media or devices through the implementation of Digital Rights Management (DRM). DRM is an approach whereby various management technologies attempt to control use of digital media by preventing or controlling access, copying or conversion of the electronic content. However, there are no universally accepted standards or methods of implementation under DRM.

As there are no industry-wide standards for DRM, many companies in the digital entertainment sector have opted for a simplistic approach where users cannot copy, print, alter or transfer material. In addition, media owners typically have no control of where or how the media file is distributed, as well as no ability to discern different levels of control for different users or different websites.

Implementation of DRM technologies is an expensive and complex undertaking resulting in only large companies, conglomerates, and associations having the ability to finance and implement any significant type of control on the media files under their copyright control. Individual owners that create media files typically do not have the financial or technological resources to develop and apply DRM control to self-authored material. Given the rising popularity of many internet based social networks there are a large number of users that upload media file without any ability to control the distribution, modification, or use of their material.

What are needed, therefore, are systems and/or methods to alleviate the aforementioned deficiencies. Particularly, what is needed is an efficient and cost effective approach that allow owners of media filed to control the distribution, modification, and use of their own media files.

BRIEF SUMMARY

Consistent with the principles of the present invention as embodied and broadly described herein, the present invention includes a playback restriction system consisting of a media delivery system and a playback rules system. The media delivery system controls the delivery of the media file with embedded restrictions that have been defined by the media owner. The playback rules system controls the nature of the restrictions and the rules by which they are applied. The media owner also has the option to direct users of their restricted media file to a location of a more valuable website where the media can be viewed with a less restrictive set of rules.

In an embodiment of the invention, a media delivery system and playback rules system are under the control of a single entity, thereby allowing the single entity to control the distribution as well as the access and associated playback restrictions of a media file. In this embodiment the playback rules are embedded within the media file and not within any type of player necessary to access the media file.

In another embodiment a media delivery system and a playback rules system are under the control of a single entity but the playback rules are implemented by an associated media player device, service, or software program.

In yet another embodiment the media delivery system and a playback rules system are under the control of separate distinct entities whereby through other means, such as a contractual agreement, the entities controlling and administering the media delivery system and the playback rules system will coordinate their respective responsibilities.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION

The present invention relates to a media file owner's ability to define and control playback restriction of his/her own media files. In embodiments of this invention, a media file owner will upload a media file to a media delivery system while a user's access and playback restrictions for that media file are defined and controlled by a playback rules system. The control, access, and associated rules of a media file are embedded within the media file itself. In this manner the media file may only be accessed in accordance with the playback rules associated with the particular situation, thereby thwarting unauthorized access and distribution.

While specific configurations, arrangements, and steps are discussed, it should be understood that this is done for illustrative purposes only. A person skilled in the pertinent art(s) will recognize that other configurations, arrangements, and steps may be used without departing from the spirit and scope of the present invention. It will be apparent to a person skilled in the pertinent art(s) that this invention may also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
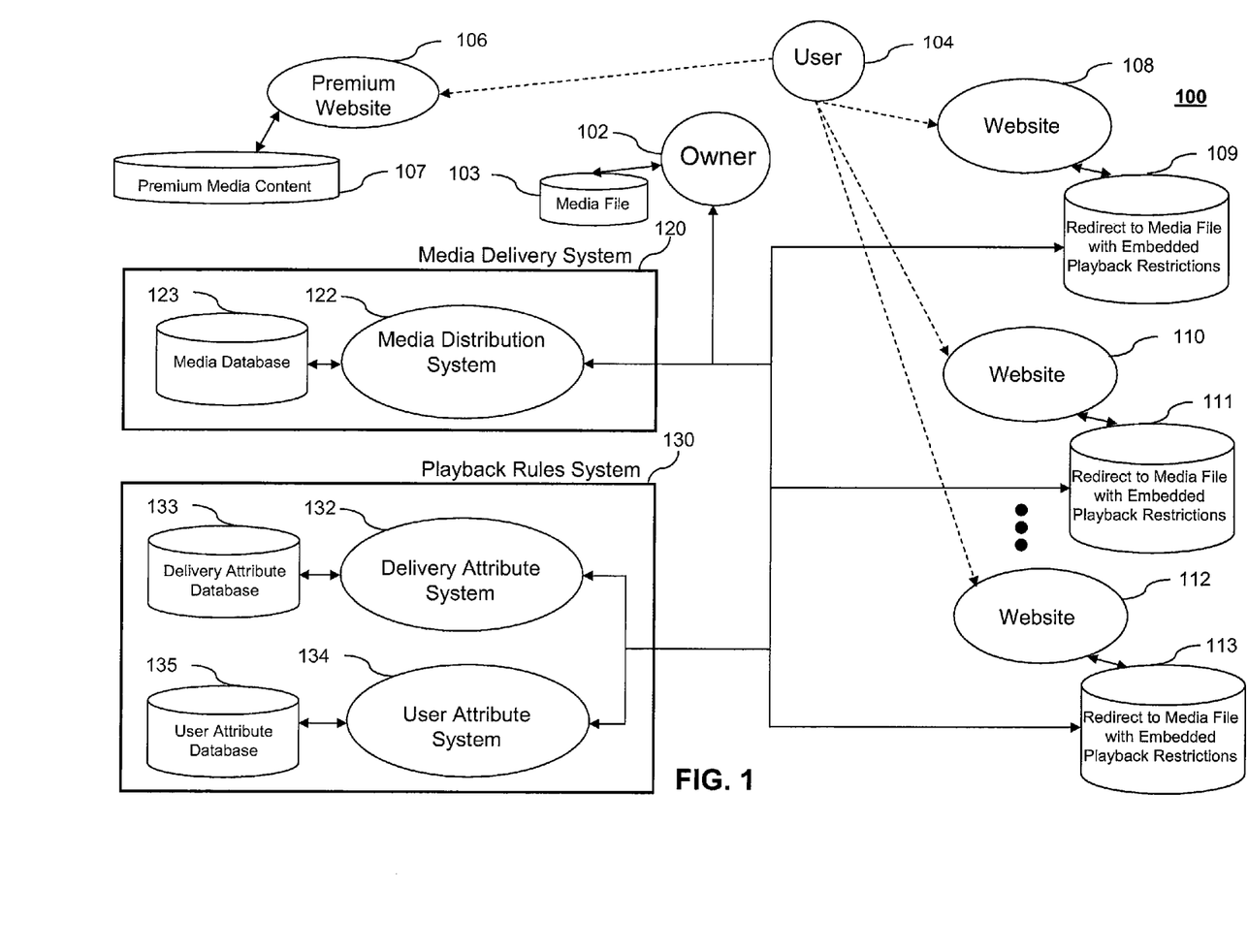
FIG. 1 is a system diagram depicting an implementation of a system for embedding web based media playback restrictions based on selectable criteria according to an embodiment of the present invention.

FIG. 1 is an illustration of a system 100 for managing the distribution of a media file for access through multiple websites with defined playback rule restrictions according to an embodiment of the present invention. System 100 contains a media delivery system 120 and a playback rules system 130 which will define what websites can access an owner's media file and what restrictions, if any, apply to the user attempting to access the media file.

The process is initiated by a media owner 102 deciding to post a media file 103 to a media distribution system 122. A media distribution system can be contained within a web site, service provider, or any telecommunications network. In addition, a media distribution system may be accessed by a user or owner through any type of re-direction from a website that does not contain a media distribution system. Once the owner decides to post a media file 103 to a media distribution system 122 and that system accepts the request by the owner 102, the media file 103 would be loaded into a media database 123. As referred to herein, a database can be a table, list, or any other organization or collection of information known to one of skill in the art, whether represented, for example, as a flat file or a set of relational tables, lists, or records.

Once an owner's media file 103 is resident on the media database 123, the owner then specifies the desired associated playback rules for that media file. The playback rules system 130 contains two systems that control the playback restriction process, a delivery attribute system 132 and a user attribute system 134. The delivery attribute system 132 controls playback restrictions for the owner's media file 103 that are based upon, for example, a specific website as represented by websites, 108, 110, and 112. The media owner would specify a list of websites that would have access to the media file 103, or in the alternative, websites that do not have access to the media file 103.

In a similar manner, the delivery attribute system 132 would control the type of playback restrictions associated with a certain website. A user 104 requesting access, as an example, to a media owner's media file 103 from website 108, may be given access to the file but with a particular set of playback restrictions, based on the particular website, that could include at least one of the following playback restrictions, including but not limited to a compromised video quality, compromised audio quality, restriction to a portion of accessible media, restriction to a period of time in which the media is accessible, restriction to an audio range of the accessible media (e.g. limited fidelity with no bass and no high notes), restriction to a visual range of the accessible media (e.g. only in black and white), restriction to an amount of bandwidth for delivery of the accessible media, restriction to a size of accessible media, as well as a restriction to a display of identified objects within the accessible media.

As an example, user "A" could visit website 108, and find that owner's media file 103 was available for viewing. However, because of the defined playback restrictions for website 108 only the first 30 seconds of the media file could be viewed. But when the same user "A" would visit website 110 the user "A" would find that there are no listings or links that reference owner's media file 103. But again, if user "A" visited website 112, user "A" may find a link to the media file 102 where the entire media file was available for viewing but only in an extremely reduced resolution.

In the illustrated embodiment the delivery attribute database 133 contains the information regarding what playback restrictions are associated with particular websites. The delivery attribute database 133 may also be designed so that websites that are not defined, or known by the playback rules system would either be presented with a default set of playback restrictions, or with full restrictions that would deny access to any portion of the media file.

In this embodiment, neither website 108, website 110, nor website, 112, store the owner's media file 103 in its own respective storage medium or database. Rather, when user 104 visits website 108, and finds that owner's media file 103 is accessible, with or without some type of playback restrictions, the request for the media file 103 is referred by logic at website 109 back to the media distribution system 122 which is responsible for the streaming or downloading of the media file 103 given the playback restrictions as defined by the playback rules system 130. The playback rules system 130 may embed the playback restrictions using, for example, any type of flash widget or java applet based technology within the media file during the download and playback process.

In addition, the playback rules system can control access to a media file 103, or impose some type of playback restriction based on a type, or set, of user attributes. A user attribute may be a type of categorization of a user that would include at least one of the following type attributes, including but not limited to a url pattern, an IP address range, a geographic region, a time zone, a date and time range, a frequency of contact, a browser type, as well as the type of user account.

Applying user attribute restrictions based on categorization of users could result, as an example, in the following scenario. User "A" could visit website 108 and find that owner's media file 103 was available for viewing where only the first 30 seconds of the media file could be viewed because of the playback rules in the delivery attribute system that are defined for website 108. However, when a different user "B" visits website 108 where user "B", according to the user attribute system 134, has an IP address associated with an address range that is of particular interest to the owner, user "B" is allowed to view 90 seconds of the media file, versus only 30 seconds for user "A." In the same manner, the user attribute restriction could alternately impose a stricter restriction on user "B" and impose a 15 second viewing limit.

The playback restrictions defined under the delivery attribute system 132 and the user attribute system 134 can be independent as well as additive, or include any amount of selection logic that the owner chooses, with or without the input of entities in control of a website, media distribution system, and playback attribute system.

Lastly, the owner 102 or media delivery system 120 would have the option to direct user 104 to an identified premium website 106 where the user could access the owner's media file 103 with a less restrictive set of playback rules. This process would encourage a user with access to the media file 103 having embedded playback restrictions, through a website such as 108, to visit a "premium" website to view the media file 103 with a less restrictive set of playback rules thereby encouraging users to visit the premium website.

Figure 2:
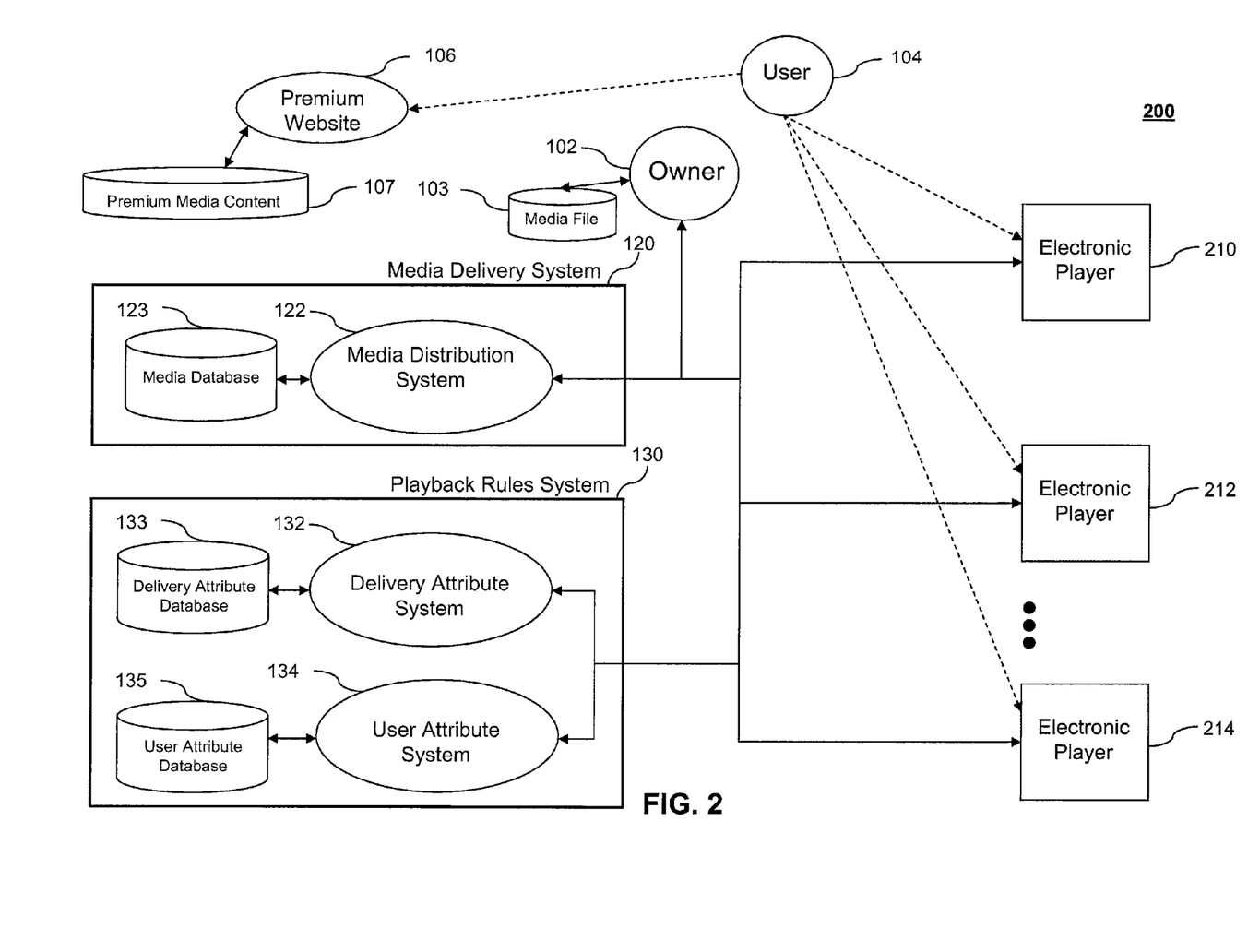
FIG. 2 is a system diagram depicting an implementation of a system for embedding electronic player media playback restrictions based on selectable criteria according to an embodiment of the present invention.

FIG. 2 is an illustration of a system 200 for managing the distribution of a media file for access through multiple electronic players with defined playback restrictions. Rather than accessing an owner's media file through a website, as in FIG. 1, FIG. 2 illustrates a process where the access point for a media file is an electronic player. An electronic player can be a stand alone device, wireless apparatus, wired apparatus, or software system that can access an owner's media file utilizing one or more communication services comprising a telecommunications system, the Internet, or a wireless network through the use of streaming media computer servers as well as download computer servers.

The system of FIG. 2 comprises a playback rules system 130 which contains two systems controlling the playback restriction process, a delivery attribute system 132 and a user attribute system 134 according to an embodiment of the present invention. The delivery attribute system 132 controls playback restrictions for the owner's media file 103, where restrictions are specific to an electronic player represented by electronic player 210, electronic player 212, and electronic player 214. The user would specify a list of which electronic players would have access to the media file 103, or in the alternative, which electronic players do not have access to the media file 103.

In a similar manner, the delivery attribute system 132 would control the type of playback restrictions associated with a certain electronic player. User 104 requesting access, as an example, to an owner's media file 103 from electronic player 210, may be given access to the file but with a particular set of playback restrictions, based on the particular electronic player. These could include at least one of the following playback restrictions, including but not limited to a compromised video quality, compromised audio quality, restriction to a segment of accessible media, restriction to a period of time in which the media is accessible, restriction to an audio range of the accessible media, restriction to a visual range of the accessible media, restriction to an amount of bandwidth for delivery of the accessible media, restriction to a size of accessible media; as well as a restriction to a display of identified objects within the accessible media.

In FIG. 2, the playback rules system 130 can control access to the media file 103, or the imposition of some type of playback restriction based on a type, or set, of user attributes. A user attribute would include at least one of the following type attributes, including but not limited to a url pattern, an IP address range, a geographic region, a time zone, a date and time range, a frequency of contact, a browser type, as well as the type of user account.

Lastly, the owner 102 or media delivery system 120 would have the option to direct user 104 to an identified premium website 106 or other type of electronic player service where the user could access the owner's media file 103 with a less restrictive set of playback rules. This process would encourage a user with access to the media file 103 with embedded playback restrictions through a electronic player such as 210, to visit a "premium" website or service to access the media file 103 with a less restrictive set of playback rules thereby encouraging users to visit the premium service site.

In another alternative embodiment of the present invention, the playback rules system would download the defined playback restrictions to either a software web based media player or to an electronic player. In this manner, the entire media file 103 would be theoretically accessible through the web based media player or electronic player were it not for the player executing the restriction rules communicated to it through the playback rules system.

Figure 3:
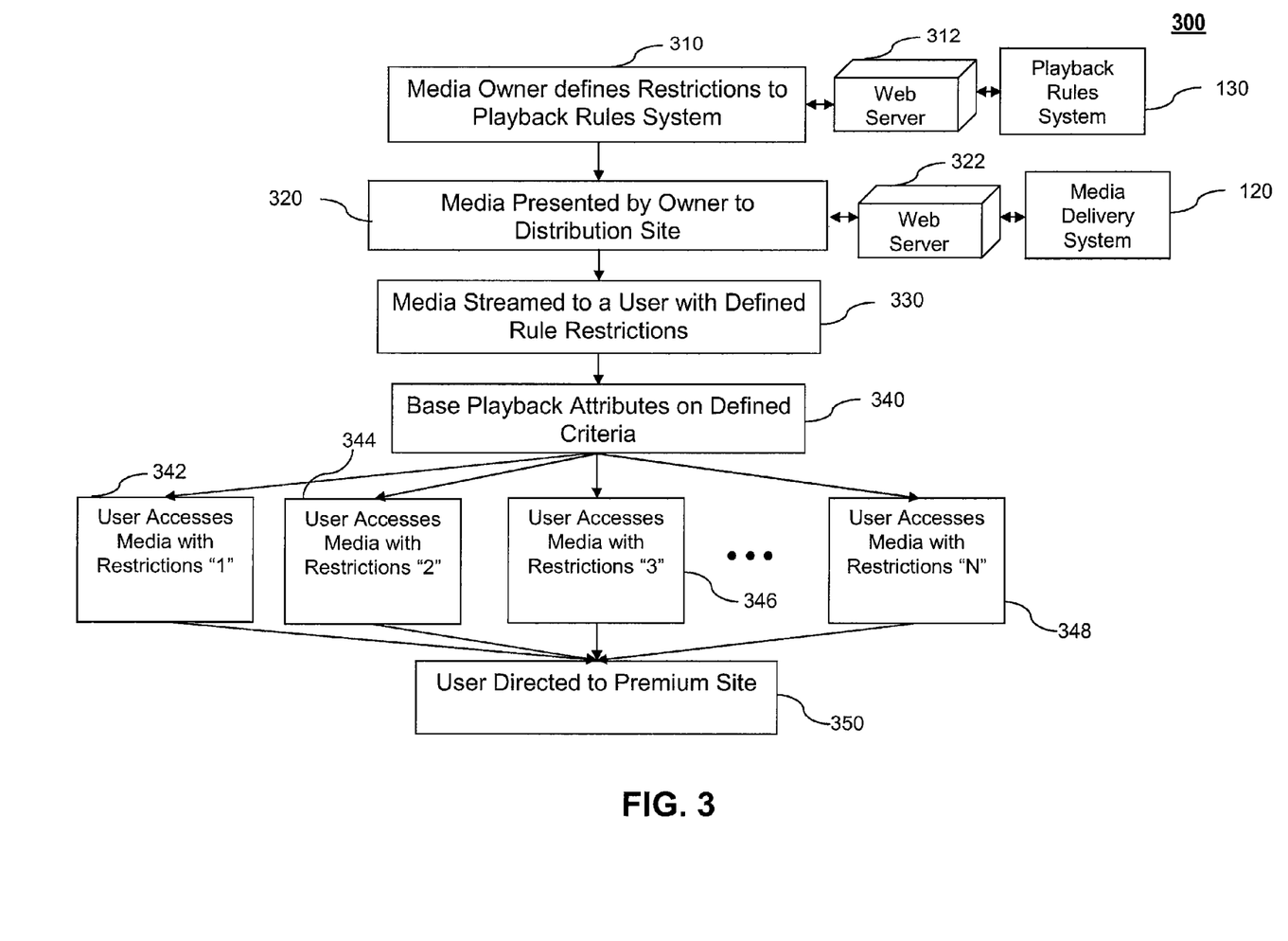
FIG. 3 is a schematic depicting an implementation of a system for embedding media playback restrictions based on selectable criteria according to an embodiment of the present invention.

FIG. 3 is a flowchart of an example implementation 300 of a web based media delivery and playback rules system in accordance with an embodiment of the present invention. In step 310, the media owner first defines the desired playback restrictions that are to be associated with a media file. The owner communicates these restrictions via a web server 312 to the playback rules system 130. The owner also presents the media to the distribution site in step 320 via a web server 322 to a media delivery system 120. Steps 310 and 320 are interchangeable in sequence, but both are completed prior to allowing the owner's media file to be streamed or downloaded to a user in step 330 according to the illustrated embodiment.

Step 340 illustrates that any playback of the owner's media file will be restricted by the defined criteria in the playback rules system. Here, if a user accesses a first website, then the user will access the media file with the associated restrictions based on the user's criteria and those associated with the first website as illustrated in step 342. In a similar manner, steps 344, 346, and 348 illustrate that a user may encounter different playback restrictions as that user accesses the same media file but from different websites. In addition, different users may encounter different playback restrictions from the same website based on user attribute rules contained within the playback rules system. The user may be directed to a premium website that offers access to the media file with a less restrictive set of playback rules as shown in step 350.

The processes of FIGS. 1, 2 and 3 can be implemented in software, firmware, or hardware, or using any combination thereof. If programmable logic is used, such logic can execute on a commercially available processing platform or a special purpose device.

Figure 4:
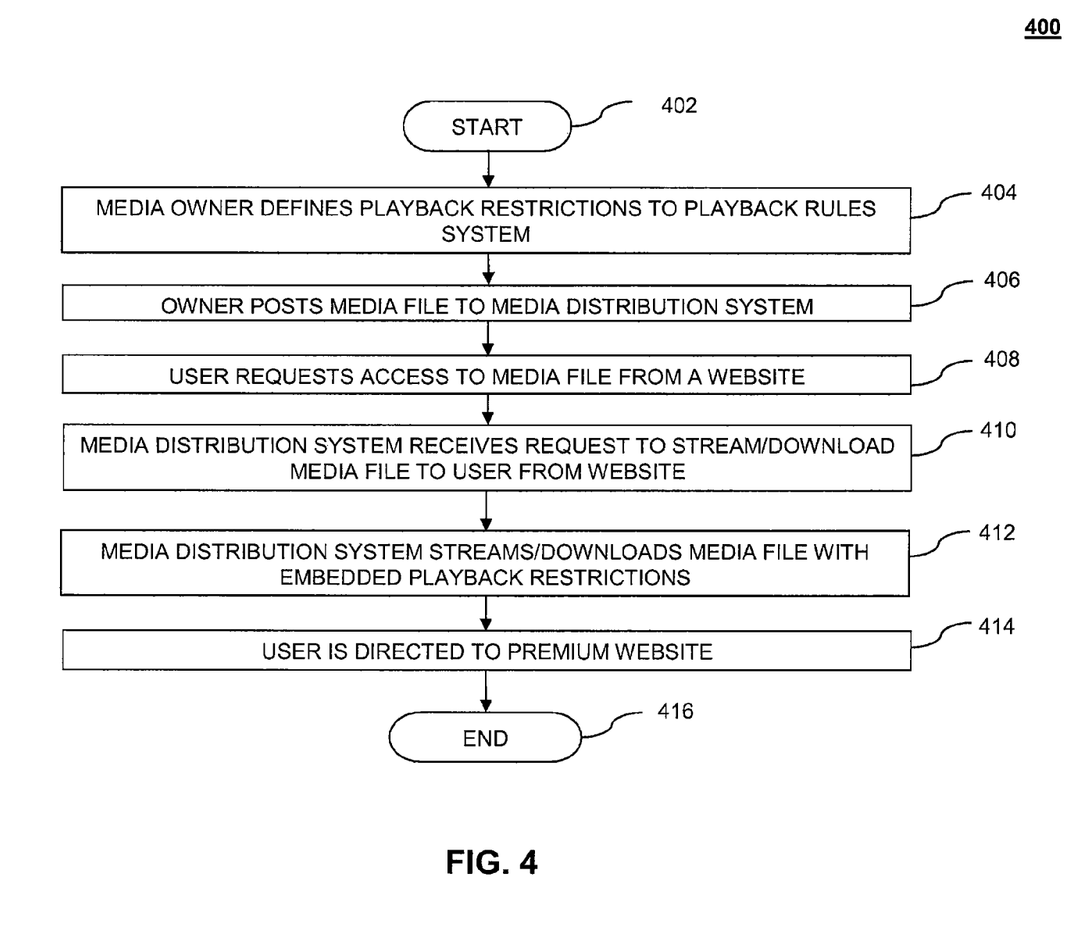
FIG. 4 is a flowchart depicting a method of embedding media playback restrictions based on selectable criteria according to an embodiment of the present invention.

FIG. 4 is a flowchart depicting a method 400 for managing the distribution of a media file for access through multiple websites with defined playback rule restrictions according to an embodiment of the present invention. Method 400 begins at step 402. In step 404, a media owner defines the desired playback restrictions, which are to be associated with the owner's media file, to a playback rules system. In step 406, the owner posts the media file to a media distribution system which controls the delivery process of the media file to a user.

In step 408, a user, visiting a website that features access to the owner's media file, requests access to the media file from the website. In step 410, the website, in response to the request, will issue a request to the media distribution system to stream or download the media file to the user. In step 412, after the media distribution system accepts the request to deliver the media file the system will stream or download the requested media file. However, the streaming or downloading of the media file will include embedded playback restrictions that have been previously defined by the user in step 404. In step 414, at some point the user will be informed of the option to visit another website, a premium website, that will contain access to the media file with a less restrictive set of playback rules. Method 400 ends at step 416.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system, comprising:
   a processor;
   a memory communicatively coupled to the processor, the memory having stored therein computer-executable instructions, comprising:
   a media delivery system configured to store and distribute a media file that includes embedded playback restrictions; and
   a playback rules system configured to store definitions of said embedded playback restrictions, wherein the embedded playback restrictions comprise a restriction on playback to an audio range and a color range of the media file; and
   wherein the media delivery system is further configured to deliver the media file with the embedded playback restrictions to a plurality of web sites.

2. The system of claim 1, wherein said playback rules system further comprises:
   a delivery attribute system configured to further define the embedded playback restrictions based on a particular website from which access to web based media files is requested; and
   a user attribute system configured to further define the embedded playback restrictions based on a set of user attributes.

3. The system of claim 2, wherein said delivery attribute system is configured to define a plurality of embedded playback restrictions for a plurality of web sites.

4. The system of claim 1, wherein the audio range comprises a limited fidelity.

5. The system of claim 1, wherein the embedded playback restrictions further comprise at least one of:
   restriction to a segment of accessible media; and
   restriction to a period of time in which the media is accessible.

6. The system of claim 1, wherein the embedded playback restrictions further comprise restriction to an amount of bandwidth for delivery of the media file.

7. The system of claim 1, wherein the embedded playback restrictions further comprise restriction to a display of identified objects within the media file.

8. The system of claim 2, wherein the user attributes comprise at least one of:
   a url pattern; and
   an IP address range.

9. The system of claim 2, wherein the user attributes comprise at least one of:
   a geographic region;
   a time zone; and
   a date and time range.

10. The system of claim 2, wherein the user attributes comprise a type of user account.

11. The system of claim 2, wherein the user attributes comprise a browser type.

12. The system of claim 1, wherein the media files contain the embedded playback restrictions using flash widget based technology.

13. The system of claim 1, wherein the media files contain the embedded playback restrictions using java applet based technology.

14. The system of claim 1, wherein said media delivery system is configured to deliver said media files utilizing a streaming media delivery technique.

15. The system of claim 1, wherein said media delivery system is configured to deliver said media files utilizing a download file delivery technique.

16. The system of claim 1, wherein the embedded playback restrictions are imposed by a web based media player through which a user accesses said one or more media files.

17. The system of claim 1, wherein the embedded playback restrictions are further embodied in an electronic player.

18. A method, comprising:
   posting a media file, by a device including a processor, to a media distribution system;
   specifying embedded playback restrictions associated with the media file, wherein the embedded playback restrictions comprise a restriction on playback to an audio range and a color range of the media file; and
   delivering the media file with the embedded playback restrictions to a plurality of websites.

19. The method of claim 18, further comprising presenting an option to access the media file without the embedded playback restrictions at a premium web site.

20. The method of claim 18, wherein the embedded playback restrictions further comprise an audio range with a limited fidelity.

21. The method of claim 18, wherein the embedded playback restrictions further comprise at least one of:
   restriction to a segment of accessible media; and
   restriction to a period of time in which the media is accessible.

22. The method of claim 18, wherein the embedded playback restrictions further comprise restriction to an amount of bandwidth for delivery of the media file.

23. The method of claim 18, wherein the embedded playback restrictions further comprise restriction to a display of identified objects within the media file.

24. The method of claim 18, wherein the embedded playback restrictions are based on user attributes that comprise at least one of:
   a url pattern; and
   an IP address range.

25. The method of claim 18, wherein the embedded playback restrictions are based on user attributes that comprise at least one of:
- a geographic region;
- a time zone; and
- a date and time range.

26. The method of claim 18, wherein the embedded playback restrictions are based on user attributes that comprise a type of user account.

27. The method of claim 18, wherein embedded playback restrictions are based on user attributes that comprise a browser type.

28. The method of claim 18, wherein the embedded playback restrictions are further embodied in an electronic player.

29. A system, comprising
- means for posting, by a media owner, a media file to a media distribution system;
- means for specifying embedded playback restrictions associated with the media file, wherein the playback restrictions comprise a restriction on playback to an audio range and a color range of the media file;
- means for delivering the media file with the embedded playback restrictions to a plurality of websites.

30. The system of claim 29, further comprising means for presenting an option to access the media file without the embedded playback restrictions at a premium web site.

31. A non-transitory computer-readable medium having instructions stored thereon that, in response to execution, cause at least one device including a processor to perform operations, comprising
- posting, by a media owner, a media file to a media distribution system;
- specifying embedded playback restrictions associated with the media file that are based on a user and a first website, wherein the playback restrictions comprise a restriction on playback to an audio range and a color range of the media file; and
- delivering the media file with the embedded playback restrictions to a plurality of websites.

32. The non-transitory computer-readable medium of claim 31, the operations further comprising presenting an option to access the media file without the embedded playback restrictions at a premium distribution system.

33. The system of claim 1, wherein the media file is owned by an individual owner.

34. The system of claim 33, wherein the individual owner of the media file does not control the media distribution system.

* * * * *